Figure 1:
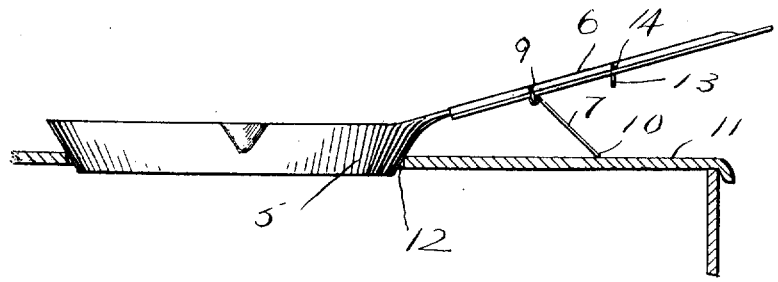
Figure 1:
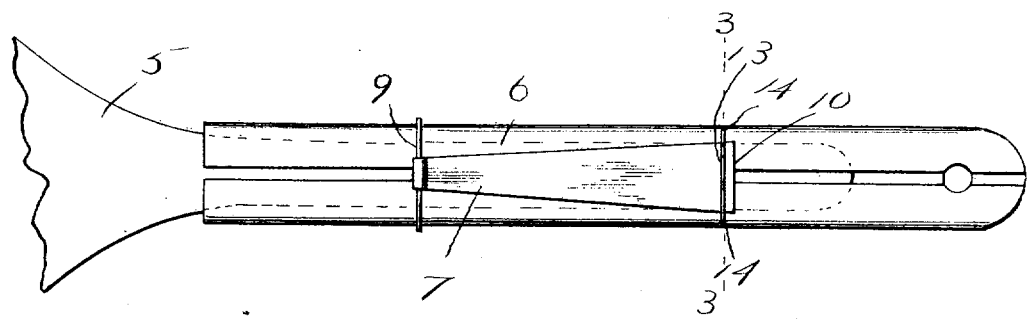

No. 892,467. PATENTED JULY 7, 1908.
L. I. TOOTHAKER.
FRYING PAN.
APPLICATION FILED MAR. 4, 1907.

Inventor
Lucy I. Toothaker.

Witnesses
J. C. Simpson.
M. F. Miller.

Attorneys

UNITED STATES PATENT OFFICE.

LUCY I. TOOTHAKER, OF PORTLAND, MAINE.

FRYING-PAN.

No. 892,467.  Specification of Letters Patent.  Patented July 7, 1908.

Application filed March 4, 1907. Serial No. 360,390.

*To all whom it may concern:*

Be it known that I, LUCY I. TOOTHAKER, a citizen of the United States, residing at Portland, in the county of Cumberland, State of Maine, have invented certain new and useful Improvements in Frying - Pans; and I do hereby declare the following to be a full, clear, and exact description of the invention, such as will enable others skilled in the art to which it appertains to make and use the same.

The present invention relates to improvements in frying pans, and it aims to provide a culinary utensil of that class, whose handle has hinged thereto a member movable into and out of position to serve as a brace, this member being so disposed with respect to the handle that, when in operative position, it bears upon the stove or other surface upon which the vessel is supported, and resists any tendency of the latter to tilt, while in its inoperative position, it may be folded against the under face of the handle and retained in such position by a latch of any preferred form.

The invention will be readily understood from the following detailed description, and its preferred embodiment is illustrated in the accompanying drawings, in which like parts are designated by corresponding reference numerals in the several views.

Figure 2:
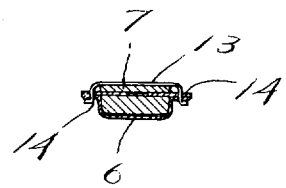
Figure 3:

Of the said drawings—Figure 1 is a side elevation showing the brace member in its operative position. Fig. 2 is an enlarged bottom plan view of the lower end of the handle, showing the brace member folded thereagainst. Fig. 3 is a transverse section taken on the line 3—3 of Fig. 2.

Referring more particularly to the drawings, the numeral 5 designates the body portion of a frying pan of the usual type provided with a so-called cooling handle, these handles being suitably secured to the pan handle as shown. The object of my invention is to provide a pan having one of these cooling handles with a brace or supporting member 7, formed of a single piece of metal and having its upper end bent to form a bail through which a hinge strap in the form of a wire collar 9 is passed and secured to the handle, so as to permit the member 7 to be swung towards and away from the latter.

The free end of the member 7 is flared or widened, as indicated by the reference numeral 10, and such end is adapted to bear directly against the upper face of the stove or other surface 11, upon which the pan is supported, the body of the pan fitting within the stove hole 12. It will thus be apparent that when in such position the member 7 will act as a brace for the pan and prevent the latter from tilting, thus effecting an even distribution of the grease within the pan.

When the vessel is not in use, the member 7 may be swung upwardly directly against the under face of the handle 6, being retained in such position by means of a swinging latch 13, comprising a piece of wire bent U-shaped and which is disposed transversely of the handle and has its opposite ends 14 bent outwardly and fitted in openings formed in the opposite edges of the handle. The latch may therefore be swung upon such ends into and out of engagement with the free end of the member 7.

By reason of the fact that the support is hinged, it may be adjusted to hold the frying pan with the body thereon at different angles so that when a very small quantity of grease is in the pan, the pan may be tilted so that its rear portion will be lower than its forward end to cover whatever may be cooking in the pan. Furthermore, at times it is not desirable to have the support, and then it may be swung out of the way and held securely in accurate position.

What is claimed, is—

A frying pan as described provided with a cooling handle having two edge perforations, of a collar formed of wire secured to said cooling handle near its lower end, a brace made of a piece of sheet metal having broad lower end and a bail engaging said collar and a swinging latch made of a piece of wire bent U-shaped and having its end carried through said edge perforations and bent outwardly so positioned as to engage the broad end of said brace when not in use.

In testimony whereof, I affix my signature, in presence of two witnesses.

LUCY I. TOOTHAKER.

Witnesses:
 CONSTANCE L. KILBORN,
 LLEWELLYN BARTON.